G. E. BIGELOW.
FABRIC MAKING MACHINE.
APPLICATION FILED DEC. 30, 1908.

1,043,897.

Patented Nov. 12, 1912.
9 SHEETS—SHEET 1.

WITNESSES
J. Clyde Ripley.
E. Bradford

INVENTOR
George E. Bigelow.
ATTORNEY

G. E. BIGELOW.
FABRIC MAKING MACHINE.
APPLICATION FILED DEC. 30, 1908.

1,043,897.

Patented Nov. 12, 1912.
9 SHEETS—SHEET 4.

WITNESSES

INVENTOR
George E. Bigelow.
BY
ATTORNEY

G. E. BIGELOW.
FABRIC MAKING MACHINE.
APPLICATION FILED DEC. 30, 1908.

1,043,897.

Patented Nov. 12, 1912.

WITNESSES

INVENTOR
George E. Bigelow.
ATTORNEY ered as possible.# UNITED STATES PATENT OFFICE.

GEORGE E. BIGELOW, OF WATERBURY, CONNECTICUT, ASSIGNOR TO THE MATTATUCK MANUFACTURING COMPANY, OF WATERBURY, CONNECTICUT, A CORPORATION OF CONNECTICUT.

FABRIC-MAKING MACHINE.

1,043,897.　　　Specification of Letters Patent.　　Patented Nov. 12, 1912.

Application filed December 30, 1908. Serial No. 470,059.

*To all whom it may concern:*

Be it known that I, GEORGE E. BIGELOW, a citizen of the United States, residing at Waterbury, in the county of New Haven and State of Connecticut, have invented certain new and useful Improvements in Fabric-Making Machines, of which the following is a specification.

My invention relates particularly to machines for making fabrics consisting of wire links connected by perforated plates such as are used as bed springs. The use of the fabric however, is of course immaterial and it will be understood that the invention is not limited to the specific type of fabric herein illustrated.

The particular object of this invention is the automatic connection, assembling or weaving of longitudinal strands to produce a fabric.

As bed fabrics are now made by hand in different sizes I have desired to arrange and construct the machine so as to produce different widths and lengths of fabrics and fabrics with different lengths of links. A series of parallel stands previously formed are intermittently drawn along by feed devices while being sufficiently retarded to keep the strands straight in proper position. When the strands are stationary centering devices engage one plate in each strand and hold the plates while the cross links are fed so as to insert the ends of the links through the side holes of the plates. The ends are then bent over so as to permanently connect the strands. The strands are preferably fed through the machine in continuous lengths. In order to separate the fabric into the desired lengths I automatically open up the links of the strands when the proper length has been run through so that the strand links can be disconnected.

The accompanying nine sheets of drawings illustrate the invention.

Each of the strands from which the fabric is made consists of a plurality of wire links such as 1 and 2 connected by perforated plates such as 3, 3. The ends of the links are hooked into the top and bottom perforations of the plates and clenched over so as to effect a permanent connection. These longitudinally extending strands are connected at intervals by cross links such as 4, 4 whose ends are hooked into the side perforations of the plates and clenched down. Usually the marginal strand plates such as 5, 5 are triangular since there is no necessity of cross connection therebeyond.

The strands are fed downward in the machine herein illustrated and the cross links are fed horizontally and the movements of the various parts will be described with relation to such arrangement. This is the preferred form but I wish it understood that I consider the invention of a scope broad enough to cover other directional relations except so far as the claims are specifically limited by their terms.

Figures 1, 2, 3, 4:
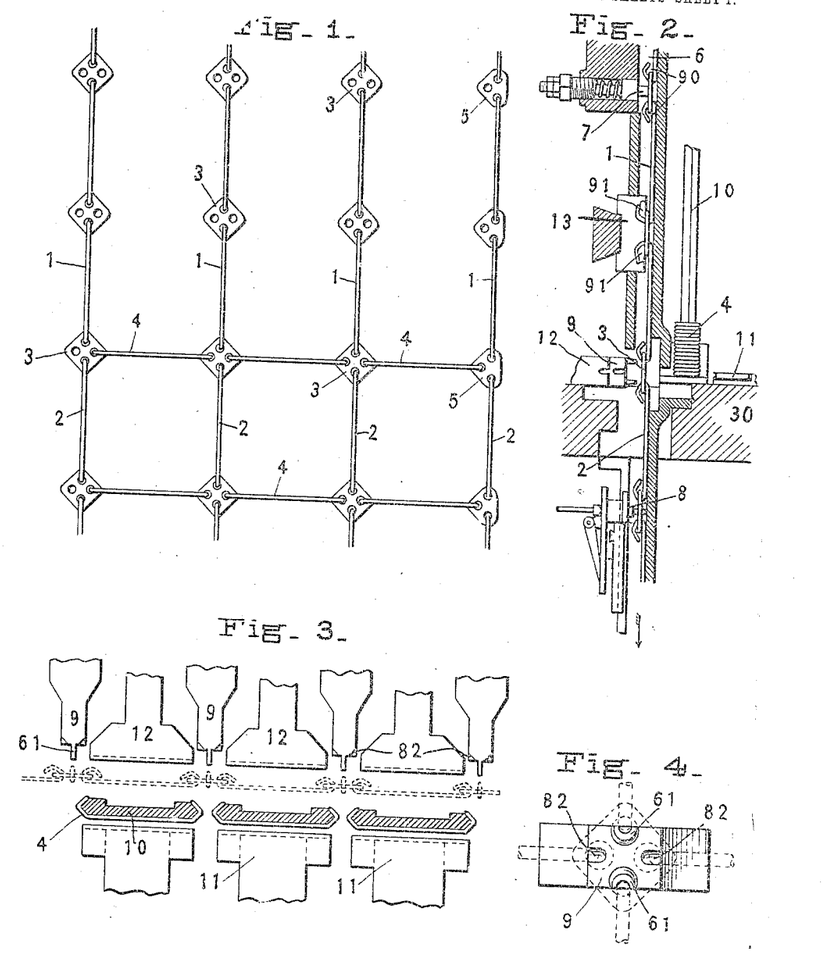
Figure 1 is a view of a fragment of fabric in process of construction.
Fig. 2 is a diagrammatic vertical sectional view of a machine of my invention showing the fabric of Fig. 1 in process of manufacture.
Fig. 3 is a similar plan view, the fabric being shown dotted.
Fig. 4 is a detail end view of one of the devices for centering a plate and rolling over the end of the adjacent cross links.

Each strand is continuous and passes through a guide indicated at 6 in Fig. 2. A frictional device 7 retards the strand and produces tension against the strand feeding device or draw-out 8. A device 9 which I shall call a centerer engages each plate at the assembling position and holds it steady while a cross link from guide 10 is fed through by the plunger 11 and clenched by the presser or closing device 12. Periodically an opener 13 is operated to unbend certain hooks of the strand links so that a row of plates can be disconnected and the fabric divided into definite lengths. Division could be accomplished by cutting the strands or opening the links by hand, but the method herein shown is preferred as no metal is wasted and much time is saved and greater accuracy and uniformity is secured.

Figure 5:
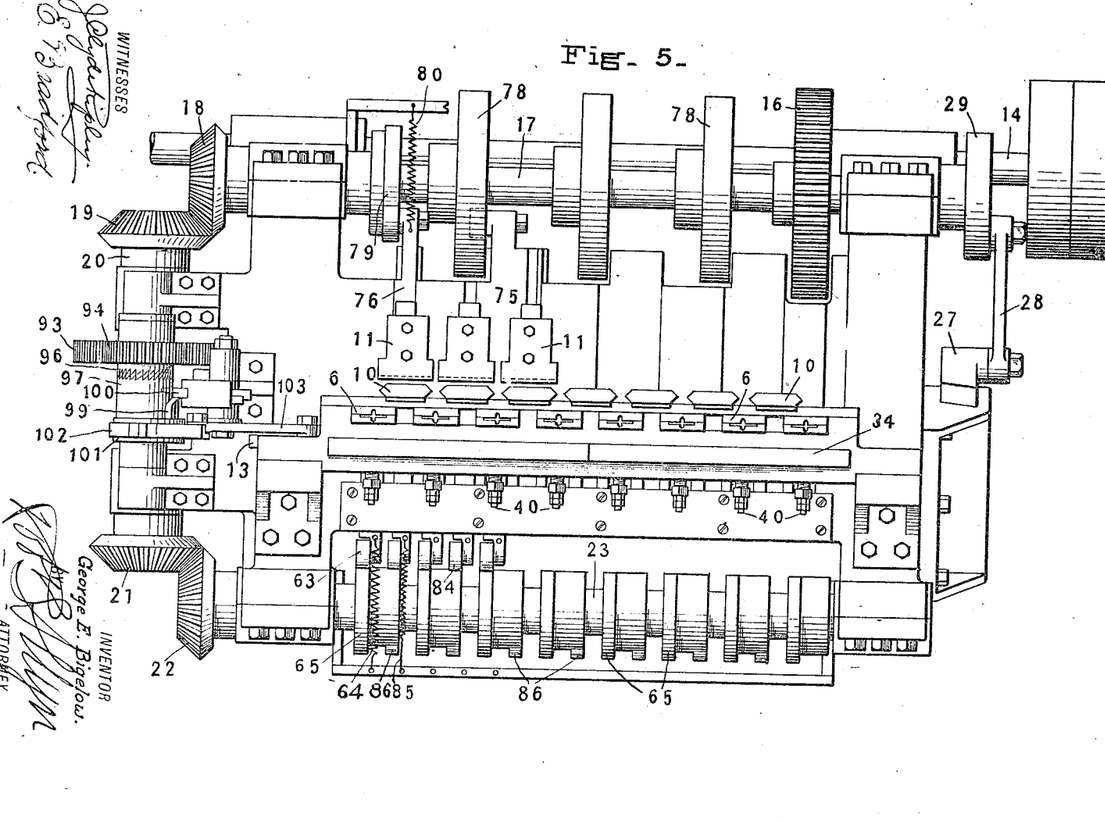
Fig. 5 is a plan view of the machine, parts of the link feeding and closing devices being omitted.
Figure 6:
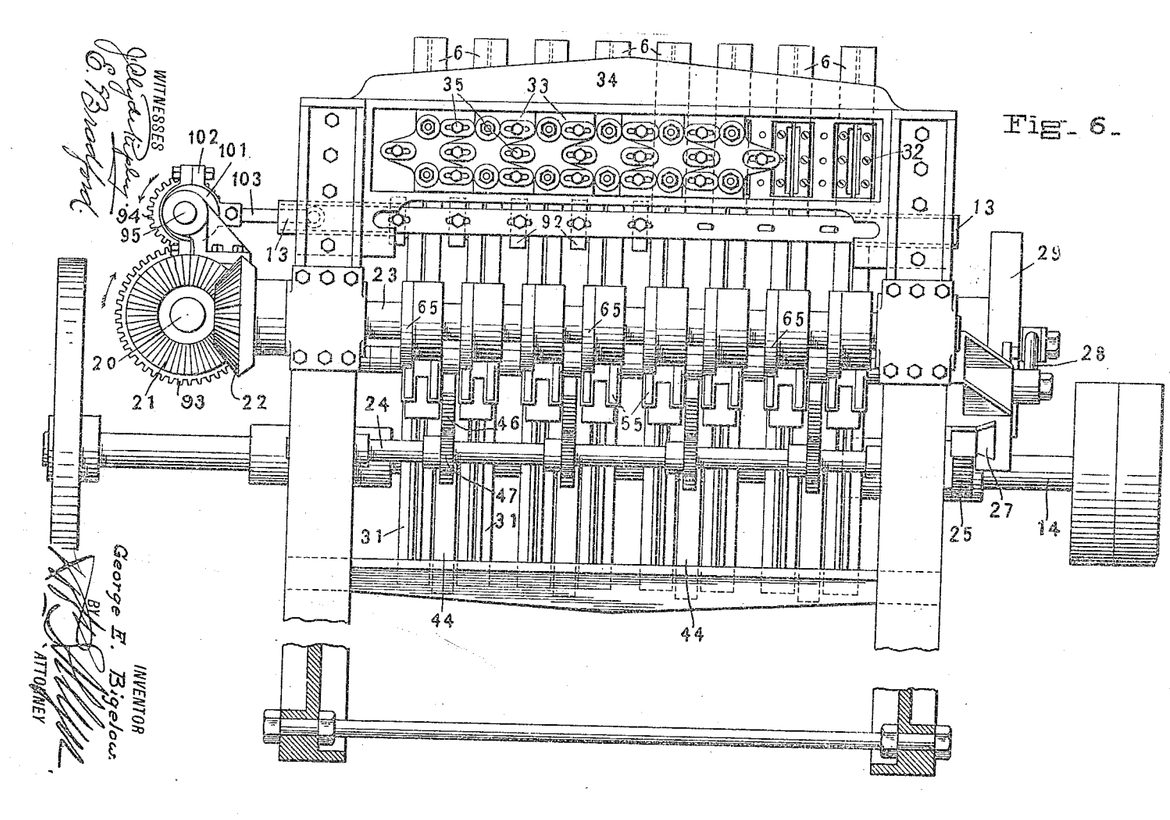
Fig. 6 is an elevation taken from the side toward which the cross links are fed and which will be called the front of the machine.
Figure 7:
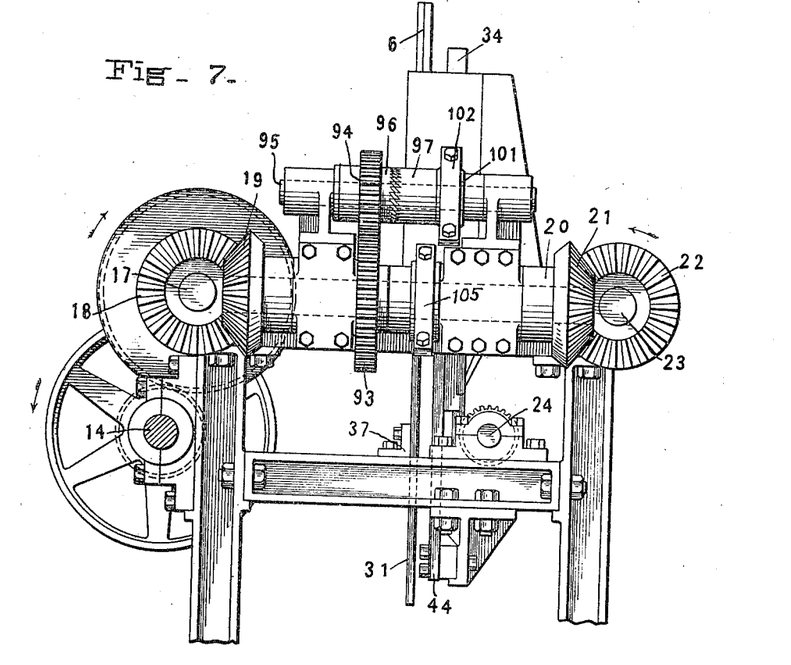
Fig. 7 is an end elevation taken from the left of Fig. 6.
Figures 14, 15:
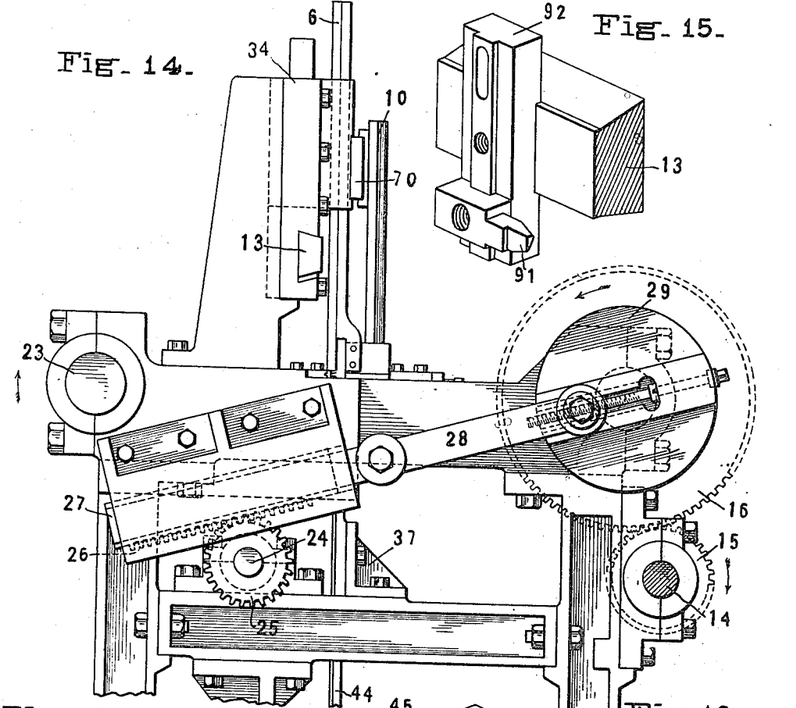
Fig. 14 is an end view of the machine from the right of Fig. 5.
Fig. 15 is a perspective view of a fragment of a bar with one of a pair of wedges for opening the strand links.

The main shaft 14 is driven in a suitable manner from any source of power. A pinion 15 on this shaft meshes with a gear 16 on the back shaft 17 and from the latter all the movements are derived either directly or indirectly as will be hereinafter described. The bevel gear 18 on shaft 17 meshes with and drives bevel gear 19 on cross shaft 20 which also has bevel gear 21 and thus drives bevel gear 22 and its shaft 23. Shaft 24 (see Figs. 5, 6 and 14) has a pinion 25 on its right hand end which is rotated backward and forward by the reciprocating movement of a rack 26 which is carried by a slide 27 operated by rod 28 connected to the crank plate 29 on the back shaft 17. The back shaft 17 operates the cross link feeding devices directly. The end shaft 20 operates the strand opening or separating devices. The front shaft 23 operates the plate centering devices and the cross link closing or clenching devices. The lower shaft 24 operates the strand feeding or draw-out devices.

The different elements will be described under appropriate paragraph headings in order to facilitate examination and comparison and to lay a basis for concise and yet comprehensive claims.

*Strand guides.*—These details will be more readily understood by referring to Figs. 6, 16, 17, 18 and 22. Each guide has an upper portion 6 above the bed or table 30 and leading to the assembling point and a lower portion 31 below. The upper portion consists of front and back pieces suitably secured together and so shaped as to provide a passage cross-shaped in horizontal section (see Fig. 18). The strand links and plates are guided in this passage. Each guide is secured in any suitable manner, for instance by one or more screws such as 32, to a holder 33 (see Fig. 22). These holders are so shaped as to lap by one another and thus get a broad bearing against the frame 34 (see Figs. 6 and 17). Each holder is clamped to the frame by bolts such as 35, 35 which pass through horizontally elongated holes in the holder. It is thus possible to adjust the holders horizontally and alter the distance between the guides to correspond with the distance between the strands. Each lower guide 31, has a groove 36 in the front to accommodate the strand links and is secured to the bar 37 (see Fig. 21) by bolt and slot connection similar to the clamping of holder 33 by bolt 35 so that it is horizontally adjustable.

Figures 16, 17, 18:
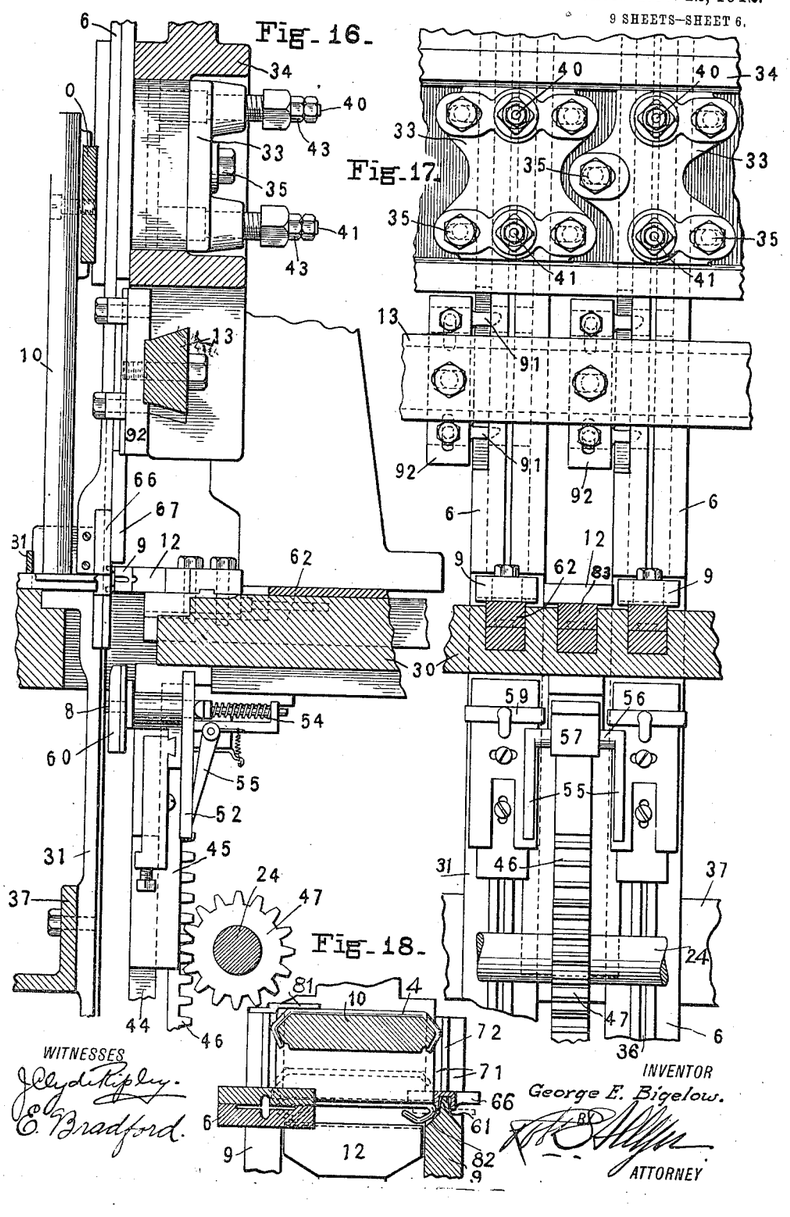
Fig. 16 is a vertical sectional view showing the strand guide, tension device, opener and draw-out and the cross link guide, feed plunger and closer and the plate centerer.
Fig. 17 is a front view of the same.
Fig. 18 is a horizontal section and plan showing a strand guide and separators and the link guide, feed plunger and closer and a centerer.
Figure 19:
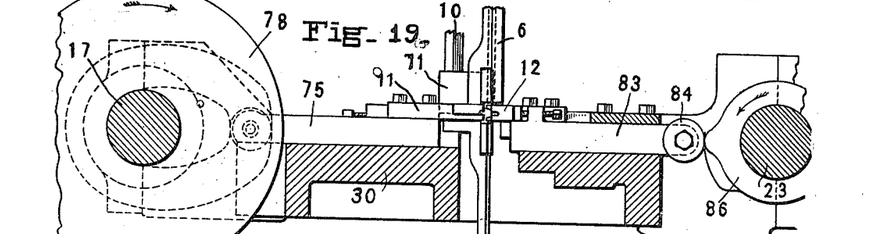
Fig. 19 is a vertical sectional view showing the cross link feeding and closing mechanism.
Figures 21, 22:
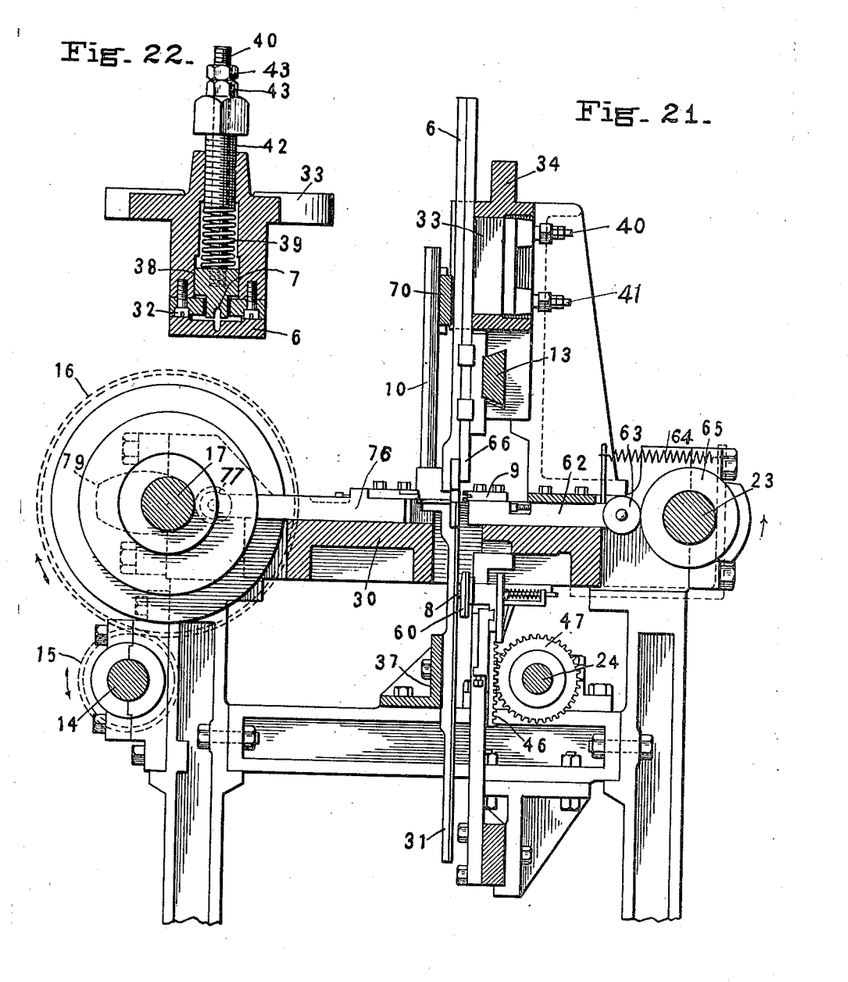
Fig. 21 is a vertical section looking toward the right in Fig. 5.
Fig. 22 is a horizontal sectional view of one of the strand tension devices.

*Strand tension.*—This is accomplished as shown in Figs. 16, 17 and 22. A shoe 38 in each holder 33 is pressed by a pair of springs such as 39 so as to cause its grooved portion 7 to bear against the plates of the strands and cause sufficient friction to retard the strand properly and hold it in position while passing through the machine. A pair of posts 40 and 41 are secured in each shoe 38 and the springs surround the posts. The pressure of each spring may be adjusted by a bushing such as 42 which screws into the holder 33. The permissive inward movement of the posts and shoe may be varied by adjusting the nuts 43, 43. As the tension devices are carried by the holders which also carry the upper strand guides the adjustment of the two is effected at the same time.

Figures 8, 9, 10:
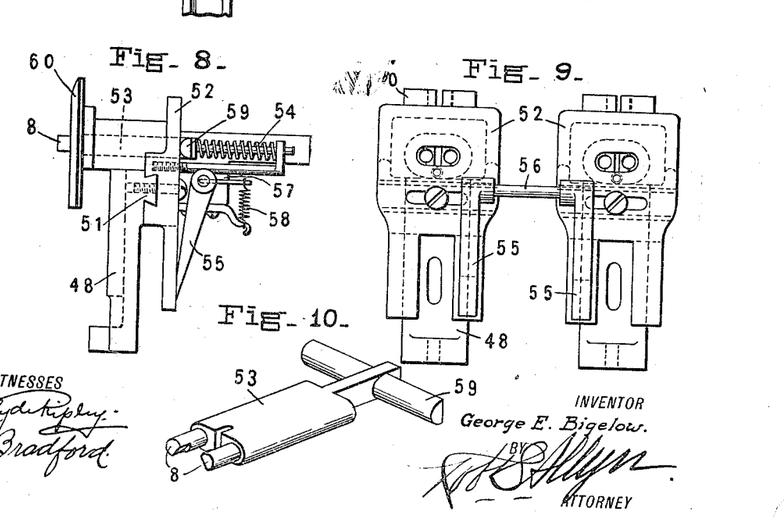
Fig. 8 is a side view of one of the strand feeding or drawing out devices.
Fig. 9 is a front view of parts of two draw-outs.
Fig. 10 is a perspective view of the draw-out plate-engaging plunger.
Figures 11, 12:
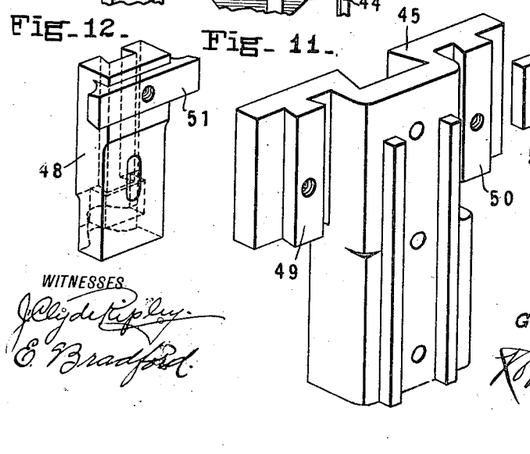
Fig. 11 is a perspective view of a slide which carries two of the draw-outs.
Fig. 12 is a perspective view of a block which is mounted on the slide of Fig. 11.
Figure 13:
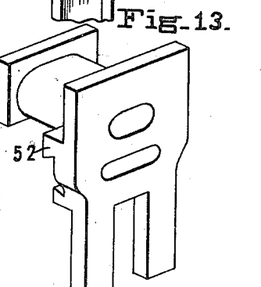
Fig. 13 is a perspective view of a holder mounted on the block of Fig. 12.

*Strand feed or draw-out.* (See Figs. 6 to 13 inclusive and Figs. 16 and 21.)—Between each alternate pair of lower guides 31, 31 (Fig. 6) is a support 44 on which a slide 45 (Fig. 11) runs. A rack 46 is secured to this slide and is raised and lowered as the shaft 24 and its pinions 47 are rotated back and forth. A block 48 (Fig. 12) is adjustably clamped on each of the two vertical ways 49 and 50 on opposite sides of the slide 45. Each block 48 has a way 51 on which a holder 52 (Fig. 13) is horizontally adjustable. In each holder 52 is a plunger 53 having plate-engaging fingers such as 8, 8 and pressed toward the strand by spring 54 (Fig. 8). A pair of inclined arms or guides 55, 55 are carried by shaft 56 which is pivoted in the stationary bearing 57. Spring 58 holds shaft 56 and arms 55, 55 yieldingly in the position of Figs. 8 and 16. When the rack 46, slide 45, blocks 48, 48, holders 52, 52 and their feed plungers 53, 53 are drawn downward, the fingers 8, 8, engage and draw out the strands, the extensions 59, 59 passing under arms 55, 55, which then snap back. On the return or upward stroke the extensions 59, 59 ride up the inclined guide arms 55, 55 and the feed plungers and fingers are thus retracted and allowed to pass over the strand plates, snapping back again as the extensions 59, 59 are released above the upper ends of the arms 55, 55. Repetition of this movement gives an intermittent feed to the strands and the entire fabric. A shoe 60, carried by holder 52 serves to position the strand and plates adjacent the draw-out fingers 8, 8. The length of feed stroke may be varied by adjusting the connection on crank plate 29, Fig. 14.

*Strand centering.* (See Figs. 2, 3, 4 and 16 to 21 inclusive.)—When the strands are stationary the cross links 4, 4 are connected. In order to accomplish this accurately I prefer to hold the strand plates 3, 3 while the cross link hooks are being inserted in the side holes by what I shall term centering devices or centerers such as 9, 9. Each centerer has two prongs 61, 61 which are concave on their upper and lower surfaces and adapted to engage in the upper and lower holes of a plate 3 below and above the upper and lower connected strand links respectively. The holes in the plates are considerably larger in diameter than the wire of which the hooks are made and thus leave room for the centering prongs. Each centerer 9 is carried by a slide 62 (see Fig. 20) which is guided in a groove in the bed of the machine. The outer end of the slide has a roller 63 which is pressed, by a spring 64, against a cam 65 on shaft 23. As the shaft rotates, the slide and its centering device is thus reciprocated toward and from the strand and thus engages each strand plate as it is brought into position by the strand feeding or draw-out mechanism. An anvil 66 having a vertical groove in alinement with the link receiving groove of the strand guide serves as an abutment for the strand links and plate while the centerer is advancing. The lower end 67 of the strand guide projects down close to the centerer and serves to hold back or strip the strand plate from the prongs of the centerer as the latter is retracted. Preferably the centerer 9 is secured to the slide 62 by bolts and slots (see Fig. 20) so that it can be adjusted horizontally to correspond with the position of the strand guide.

*Cross link guides.* (See Figs. 2, 16 and 18.)—The links which are to connect the strands are previously formed on a suitable machine from wire and supplied on guides such as 10, 10, the ends of each link being hook-shaped as shown in Fig. 18. The guides are appropriately shaped in cross section to permit the links to slide down and yet not have enough free play to allow them to be displaced and so fail to feed properly. Each guide 10 is secured to the cross bar 70 in any suitable manner permitting horizontal adjustment to correspond with the spaces between the strand guides 6, 6 (see Fig. 20). Beneath each side of the lower end of a link guide is a platform 71 to support the bottom link as it is being fed to the strands. A vertical flange 72 on each side of a guide serves to prevent the lateral displacement of the cross links during feeding. Each of these flanges 72 carries two of the platforms such as 71 and they constitute what I term a separator. These separators are adjustably secured to the bed of the machine and support the lower ends of the strand guides.

Figure 20:
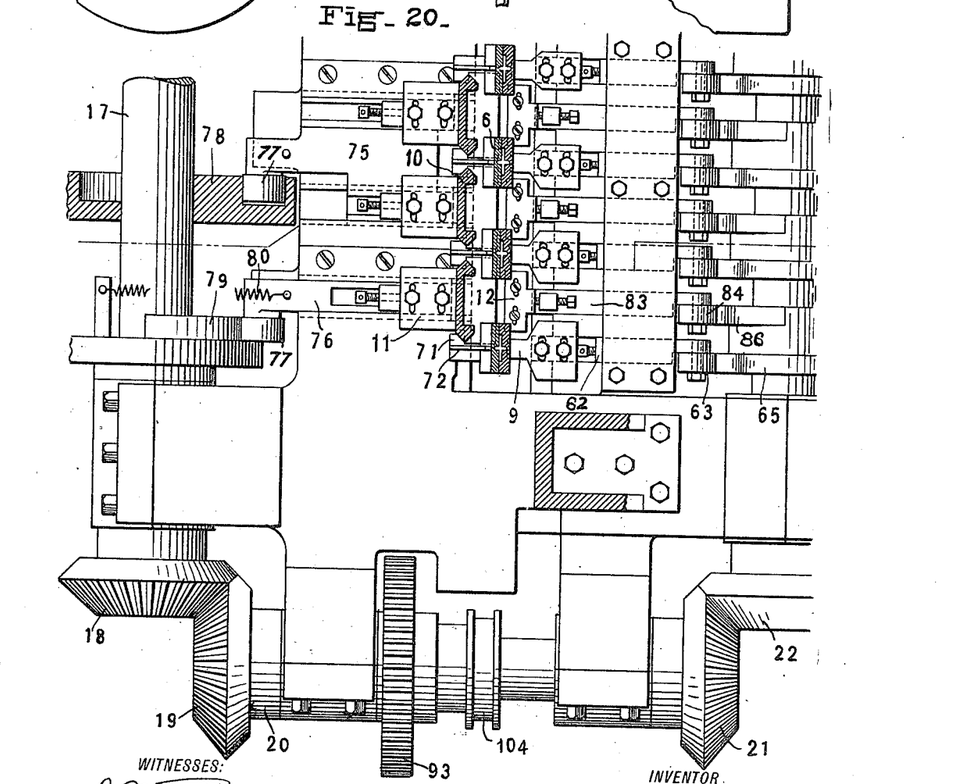
Fig. 20 is a plan and sectional view showing some of the strand guides, the plate centerers and the cross link feeding and closing devices.

*Cross link feed.* (See Figs. 2, 3, 5, 16, 18, 19 and 20.)—While the strands are held by the centering devices 9, 9 the cross links are fed from beneath the guides 10, 10 by plungers such as 11, 11. The flanges of each plunger slide on the platforms 71, 71 of the adjacent separators. The end of each plunger is grooved to fit the links better (see Fig. 2). The plungers are carried by slides, such as 75, 76, which are guided in grooves in the bed of the machine. Preferably the plungers are secured to the slides by bolts and slots, as shown in Fig. 20, so as to permit adjustment. Each slide, as 76, may carry one plunger or, as 75, two plungers. A roller 77 carried by each slide engages a cam such as 78 or 79. Cam 78 being of the box type operates the slide 75 forward and back, while cam 79 operates slide 76 only forward, a spring 80 retracting it. A finger 81 holds the links 4 when the feed plunger 11 is retracted.

*Cross link closing.* (See Figs. 3, and 16 to 20 inclusive.)—The closing movement comprises two steps viz: first, rolling over or bending the ends of the hooks slightly and second, clenching the hooks down so that they cannot be disengaged. As the feeding of the links is rectilinear the two end hooks must pass straight through the side holes of the strand plates. When they have passed through the holes, the ends engage the inclined surfaces 82, 82. These surfaces are preferably carried by or formed in the adjacent centerers 9, 9. The hooks are thus rolled or bent over as the links move forward. The final clenching is effected by the plungers 12, 12 which are brought into action while the feed plungers 11, 11 are still pressing against the links. Each clenching plunger is carried by a slide 83 which is guided in a groove in the bed of the machine and has a roller 84 pressed by a spring 85 against a cam 86 on shaft 23. The end of each plunger 12 is preferably grooved as shown in Fig. 16 so as to fit the link and prevent the hooks turning sidewise. The connection between a plunger 12 and slide 83 is preferably by screws and slots as shown in Fig. 20 so as to permit the clenching plungers to be adjusted to correspond with the feed plungers 11, 11.

Figure 23:
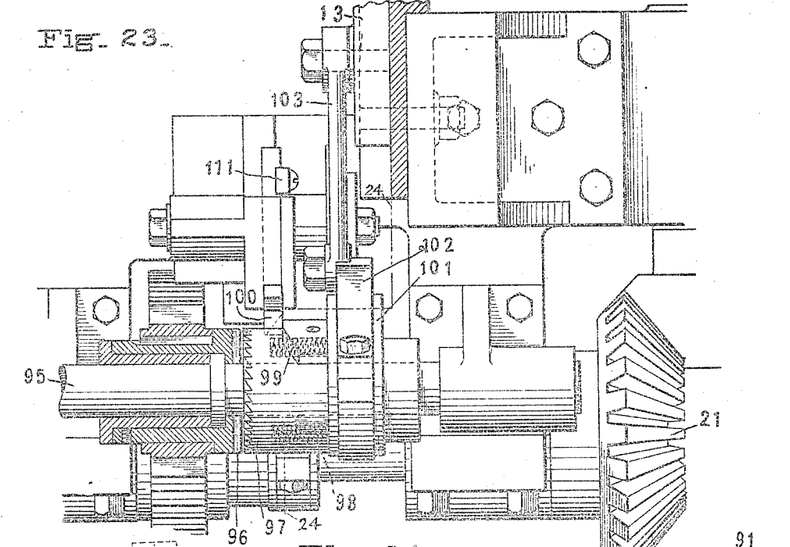
Fig. 23 is an enlarged detail plan view of the mechanism for throwing the strand link opener into operation.
Figure 24:
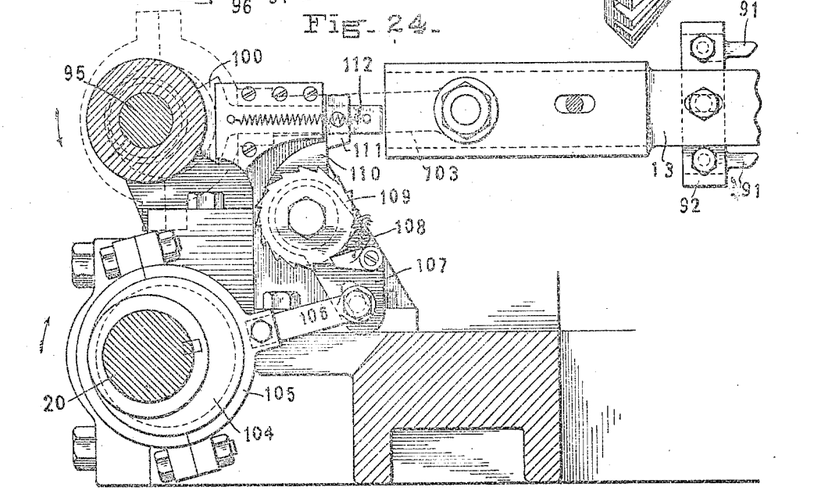
Fig. 24 is a sectional view and elevation taken from the right of Fig. 23 on the plane of the line 24—24 of Fig. 23.

*Strand opener.* (See Figs. 2, 5, 6, 7, 15, 16, 17, 23 and 24.)—It is preferred to run the strands into the machine and out again in continuous lengths. The strand links are so clenched on the plates as at 90, 90, (Fig. 2) that they cannot be disengaged except by prying open the hooked ends. This I accomplish automatically at intervals depending upon the desired length of the fabrics. A bed fabric may be say sixteen links or meshes long, in which event the hooks connecting every sixteenth plate will be partially opened as by wedges 91, 91. This does not sever the strand or alter the character of its movement but simply permits the ready removal of the link at that point after the fabric has passed out of the machine. Definite points of division are thus provided. A pair of wedges is mounted upon a holder 92 and adjustable vertically to correspond with the length of the strand links. A series of these holders is carried by the opener bar 13 at intervals corresponding to the horizontal distance between strands. The opener bar is suitably guided in the frame of the machine and reciprocated at intervals—say as in this case every sixteenth stroke of the strand feed or draw-out. The strand guides are recessed as shown in Fig. 17 to allow the wedges to engage the strand links while the links are supported in the guides. The periodic movement of the opener is effected through a train of mechanism driven from the end shaft 20. Gear 93 on this shaft meshes with gear 94 on the counter-shaft 95 and drives the latter and also its clutch member 96 continuously. The other clutch member 97 is loose on the shaft and is held disengaged from clutch member 96 most of the time. Springs such as 98 (dotted in Fig. 23) press the clutch member 97 toward the clutch member 96 but the cam 99 fixed on member 97 is intercepted by the plunger 100 except when the strand opening is to take place. The eccentric 101 rotates with the clutch member 97 but does not slide longitudinally on the shaft 95. Eccentric strap 102 is connected by rod 103 to the opener bar 13. The shaft 20 operates mechanism which periodically disengages plunger 100 from cam 99 and allows springs 98 to throw clutch member 97 into engagement with clutch member 96. Eccentric 104 on shaft 20 has a strap 105 and rod 106 connected so as to rock the arm 107 back and forth as the shaft rotates. The spring pressed pawl 108 is carried by arm 107 and operates the ratchet 109 step by step. The trigger 110 is carried by ratchet 109 and once in each revolution engages the stop 111 on plunger 100 and throws it to the right (see Fig. 24) thus releasing cam 99 and allowing the clutch to come into action. The clutch being interlocked, power is transmitted positively through shaft 20, gears 93 and 94, clutch members 96 and 97, eccentric 101, strap 102, rod 103 and opener bar 13 to open the strand links. As soon as the trigger 110 escapes to the right and below stop 111, the spring 112 throws the plunger back against the hub of clutch member 97 (see Fig. 5). When the cam 99 gets around again its nose engages the inclined nose of plunger 100 and forces the clutch member 97 again (to the right in Fig. 23) out of engagement with clutch member 96 where it remains until trigger 110 again trips the plunger 100. The parts are so designed that the number of teeth on ratchet 109 corresponds with the number of meshes determined in the fabric by the action of the strand opener. Any length of fabric can thus be easily regulated by changing the ratchet.

What I claim is:

1. A metal fabric making machine comprising means for feeding a series of strands, means for feeding hooked links transversely to the plane of said strands to connect parallel strands, and abutments for bending the ends of said links when held by said link feeding means.

2. A metal fabric making machine comprising means for feeding a series of strands having perforated plates, means for feeding links to connect said plates, and fingers for centering the plates while being connected.

3. A metal fabric making machine comprising means for feeding a series of strands, means for feeding links to connect said strands, means for centering the strands while being connected, and abutments for closing the links while the strands are centered.

4. A metal fabric making machine comprising means for feeding a series of strands, plungers for feeding links to connect said strands, means for then bending the ends of said links, and automatic means for opening some of the strand links at intervals to permit separation.

5. In a fabric making machine, a plurality of strand guides adjustable to and from each other, a plurality of similarly adjustable link guides, and means for feeding links therefrom to connect said strands.

6. In a fabric making machine, a plurality of adjustable strand guides, strand feeding devices adjustable to correspond therewith, and means for feeding links to connect said strands at intervals.

7. In a fabric making machine, adjustable strand guides, strand feeding devices, and adjustable means for opening the strand links.

8. In a fabric making machine, adjustable strand guides, adjustable centering devices, and means for feeding links to connect the strands.

9. In a fabric making machine, adjustable strand guides, adjustable centering devices, means for feeding links to connect the strands, and adjustable link closers.

10. In a fabric making machine, strand guides, link guides, means for feeding links therefrom to connect said strands, and separators between the link guides for supporting the ends of the links.

11. In a fabric making machine, strand guides, means for feeding links to connect the strands, centering devices for the strand plates, and link closing devices between the centering devices.

12. In a fabric making machine, strand guides having link guiding grooves and plate guiding grooves, link feeders, strand feeders, and means for frictionally retarding the strands.

13. In a fabric making machine, strand feeding devices, means for operating them to feed the strands intermittently, prongs for opening the strand links, and means for operating said opening prongs once for a plurality of operations of the strand feeding means.

14. In a fabric making machine, strand guides, link feeding devices on one side thereof, and link closing devices on the opposite side.

15. In a fabric making machine, strand guides, link feeding devices on one side thereof, link closing devices on the opposite side, and cam shafts with cams for operating said feeding and closing devices alternately.

16. In a fabric making machine, a strand guide and a feeding device comprising a pair of pins adapted to engage the edges of a strand plate, means for moving said pins longitudinally of said guide, and means for retracting said pins.

17. A strand feeding device comprising a plunger, means carried thereby for engaging a portion of the strand, means for moving said plunger so as to feed the strand, an inclined guide to retract said plunger on the return stroke, said guide being retracted on the feeding stroke to allow the plunger to pass beneath.

18. A strand feeding device comprising a plunger having a strand engaging portion and a pair of side arms, an inclined guide lifted on the feeding stroke to permit the arms to pass and serving to lift said arms to retract said plunger on the return stroke.

19. In a fabric making machine, strand guides, a transversely movable bar, link openers carried thereby, and means for periodically operating said bar.

20. In a fabric making machine, adjustable strand guides, a transversely movable bar, adjustable link openers carried thereby, and means for operating said bar.

21. In a fabric making machine, strand guides and feeding means, centering devices for entering the upper and lower plate holes, and means for inserting the hooks of cross links into the side holes of the plates.

22. In a fabric making machine, strand guides and feeding means, centering devices for entering the upper and lower plate holes, means for inserting the hooks of cross links into the side holes of the plates, and means for closing the hooks.

23. In a fabric making machine, centering pins for entering two holes of each plate and means for feeding links so as to insert their hooks into the unoccupied plate holes.

24. In a fabric making machine, centering pins for entering two holes of each plate, means for feeding links so as to insert their hooks into the unoccupied plate holes, and means for closing the hooks.

25. In a fabric making machine, centering pins for entering two holes of each plate, means for feeding links so as to insert their hooks into the unoccupied plate holes, and means for closing the hooks while so centered.

26. In a fabric making machine, strand guides, centering devices, link feeders, means for bending the hooks as they are inserted in the plate openings, and means for closing the hooks.

27. In a fabric making machine, strand guides, means for feeding hooked links, plungers having projections for centering the strand plates and also hook bending portions, closing devices, and means for operating said plungers and closing devices successively.

28. In a fabric making machine, vertical strand guides and feeding devices, horizontally acting link feeders, and oppositely acting link closers.

29. In a fabric making machine, vertical strand guides and feeding devices, horizontally acting link feeders, and oppositely acting centering devices and link closers.

30. In a machine of the character described, parallel guides for perforated plates, a link guide arranged adjacent thereto, and means for feeding a hooked link from said guide to engage two plates simultaneously.

31. In a fabric making machine, a combined centering and bending die having spaced centering prongs and spaced hook bending grooves.

32. In a machine of the character described, a guide for a strand composed of links and plates, and means for opening the hooks.

33. In a machine of the character described, a guide for a strand of links and plates, means for feeding said strand step by step, and means for automatically opening one of the hooks after a predetermined member of feeding actions.

34. In a fabric machine, parallel strand guides, link supply guides opposite the interval between said strand guides, and means for feeding links from said link supply guides to engage the strands.

35. In a fabric machine, parallel strand guides, link supply guides opposite the interval between said strand guides, means for feeding links from said link supply guides to engage the strands, and means for bending the hooks of the links.

36. In a fabric machine, strand guides, a transversely movable bar, and pairs of prongs carried by said bar for opening strand links.

37. In a fabric machine, strand guides, a transversely movable bar, and pairs of prongs carried by said bar for opening strand links, the prongs of each pair being adjustable relative to each other.

38. In an assembling machine, link supply guides, plate centering prongs arranged opposite the interval between said guides, and means for feeding hooked links from said guides to engage plates centered by said prongs.

39. In an assembling machine, link supply guides, plate centering prongs arranged opposite the interval between said guides, means for feeding hooked links from said guides to engage plates centered by said prongs, and means for closing the hooks of the links.

40. In an assembling machine, link supply guides, plate centering prongs arranged opposite the interval between said guides, means for feeding hooked links from said guides to engage plates centered by said prongs, and cam shoulders for bending the hooks as the links are fed.

41. In an assembling machine, link supply guides, plate centering prongs arranged opposite the interval between said guides, means for feeding hooked links from said guides to engage plates centered by said prongs, cam shoulders for bending the hooks as the links are fed, and means for closing the bent hooks.

42. In an assembling machine, plate centering prongs and means for closing bent link hooks while the plates are centered.

GEORGE E. BIGELOW.

Witnesses:
W. E. FIELDING,
WM. M. SAUNDERS.